(12) United States Patent
Norberg

(10) Patent No.: US 6,571,730 B1
(45) Date of Patent: Jun. 3, 2003

(54) ARRANGEMENT FOR MANAGING A HERD OF FREELY WALKING ANIMALS

(75) Inventor: Henrik Norberg, Tumba (SE)

(73) Assignee: DeLaval Holding AB, Tumba (SE)

(*) Notice: Subject to any disclaimer, the term of this patent is extended or adjusted under 35 U.S.C. 154(b) by 0 days.

(21) Appl. No.: 10/048,825
(22) PCT Filed: Sep. 4, 2000
(86) PCT No.: PCT/SE00/01692
   § 371 (c)(1), (2), (4) Date: Feb. 1, 2002
(87) PCT Pub. No.: WO01/17339
   PCT Pub. Date: Mar. 15, 2001

(30) Foreign Application Priority Data

Sep. 3, 1999 (SE) .................................................. 9903119

(51) Int. Cl.⁷ ............................... A01J 3/00; A01J 5/00
(52) U.S. Cl. ................................................... 119/14.03
(58) Field of Search ......................... 119/14.03, 14.02, 119/14.01, 14.14, 14.08, 840

(56) References Cited

U.S. PATENT DOCUMENTS

| 5,769,023 A | 6/1998 | van der Lely et al. | |
|---|---|---|---|
| 5,771,837 A | * 6/1998 | van der Lely | 119/14.02 |
| 5,778,820 A | * 7/1998 | van der Lely et al. | 119/14.02 |
| 5,782,199 A | 7/1998 | Oosterling | |
| 5,791,284 A | * 8/1998 | van der Lely | 119/14.02 |
| 6,019,061 A | * 2/2000 | Schulte | 116/14.03 |
| 6,263,832 B1 | * 7/2001 | van den Berg | 119/14.08 |

FOREIGN PATENT DOCUMENTS

| EP | 0639327 | 12/1994 |
|---|---|---|
| WO | 9619916 | 7/1996 |
| WO | 9619917 | 7/1996 |
| WO | 9941977 | 8/1999 |

* cited by examiner

Primary Examiner—Charles T. Jordan
Assistant Examiner—Judith Nelson
(74) Attorney, Agent, or Firm—Hovey Williams LLP

(57) ABSTRACT

An arrangement for managing a herd of freely walking animals includes an area (1) for receiving the animals, a milking station (2) and a plurality of waiting station (3) leading from the receiving area (1) to at least the milking station (2). The waiting station (3) is arranged to receive one animal and comprises one identification device (7) for identifying the animal entering the waiting station (3). The arrangement comprises a memory device (8) arranged to provide a value of a parameter related to the milk production of an animal identified by the identification device (7) and present in the waiting station (3) and by an analyzer (9) for analyzing the parameter and determining if the animal is to be milked in response to the value.

17 Claims, 3 Drawing Sheets

ARRANGEMENT FOR MANAGING A HERD OF FREELY WALKING ANIMALS

THE BACKGROUND OF THE INVENTION AND PRIOR ART

The present invention refers to an arrangement for managing a herd of freely walking animals, comprising an area for receiving the animals, a milking station and a plurality of waiting stations leading from the receiving area to at least the milking station.

In the following the animals referred to are diary cows. However, the invention is not limited to cows, but is applicable to any animals having the ability to produce large quantities of milk, such as sheep, goats, buffaloes, horses etc.

An arrangement for managing a herd of freely walking animal, for example diary cows, is disclosed in WO 96/19917. The arrangement disclosed by WO 96/19917 comprises a milking stall located in a receiving area and having a milking machine and a device for automatic attachment of the teatcups of the milking machine to the teats of the cow to be milked. The milking stall comprises an entrance and an exit and is provided for housing one single cow. A cow, one at a time, may enter the milking stall voluntarily. At the entrance of the milking stall an identification device is provided, which identifies said cow with the aid of a transponder carried by the cow entering the milking stall. The identification of a specific animal is transmitted to a computer, in which facts concerning each cow, for instance when she was last milked, etc, are stored. Thereafter, an examination device examines the condition of the udder and the teats with regard to how clean they are and if milking is needed. These facts together with the data about the specific cow, which are already stored in the computer, are processed in the computer to determine if the animal should be milked or if she is to leave the milking stall.

U.S. Pat. No. 5,771,837 discloses a milking arrangement including a receiving area, a milking station and a waiting station before the milking station. The waiting station is arranged to house one animal before it is permitted to enter the milking station or is guided back to the receiving area.

A problem with the known kind of arrangements is that occasionally a lot of cows are crowded at the entrance of the milking stall, wherein a cow, being above other cows in rank, may push herself forward through the crowd and enter the milking stall. Because of this, cows of lower rank may reach the milking stall less often. If a cow of lower rank has to wait too long she may become tired, and even leave the milking stall entrance. Consequently cows, which are above other cows in rank may prevent the latters from being milked. Furthermore, it happens that cows of high rank enter the milking stall more often than needed, wherein the cows have to leave the milking stall without being milked. This is very time consuming and results in unsatisfactory utilisation of the milking machine in the milking stall. Another problem with this arrangement is that some cows do not visit the milking stall frequently enough.

SUMMARY OF THE INVENTION

The object of the present invention is to provide an arrangement for housing a herd of freely walking animals, which arrangement is adapted to remedy the problems discussed above. Furthermore, an object of the invention is to improve the efficiency in animal management.

This object is obtained by the arrangement initially defined, wherein each waiting station is arranged to receive one animal and comprises an identification device for identifying said animal entering said waiting station, said arrangement further comprising memory means arranged for providing a value of a parameter related to the milk production of an animal identified by the identification device and present in one of said waiting stations, and means for analysing the value of the parameter and determining if an animal present in one of said waiting stations is to be milked in response to said value and with regard to said value for an animal present in another one of said waiting stations.

An advantage of this arrangement is that the utilisation of the milking machine in the milking station becomes optimal. Furthermore, since the waiting station is located ahead of the milking station and only may house one animal, a crowd in front of the milking station is avoided. The parameter may involve at least one of the lactation status of an animal, a desired interval between two milking operations of an animal and the expected milk yield of an animal. Thanks to the plurality of waiting stations, it is possible for a plurality of animals to enter a respective waiting station and either be retained in the waiting station, successively be milked in the milking station or successively enter the animal passage and consequently the receiving area. An advantage of having a plurality of waiting stations located ahead of the milking station is that a crowd of animals will arise neither in front of a waiting station nor in front of a milking station. Furthermore, this arrangement enables milking of the cow which is in greatest need of being milked independent of the rank of the cow.

According to an embodiment of the invention an animal passage leads from the waiting station past the milking station to the receiving area. Hereby, the animal present in the waiting station may either be guided through the animal passage to the receiving area or to the milking station. Furthermore, directing means are arranged to direct said animal from the waiting station either to the animal passage or the milking station. Consequently, an animal which is not to be milked may be prevented from entering the milking station.

According to a further embodiment of the invention, control means is adapted to control the directing means in response to said determination, i.e. if a cow is to be milked or not, in order to direct said animal either to the milking station in case of a milking operation of said animal or to the animal passage leading said animal through the animal passage into the receiving area. Consequently, by means of said control means, the position of the directing means are controlled. The control means may be realised by a computer which also includes said means arranged for providing a value of a parameter related to the milk production and said analysing means.

According to a further embodiment of the invention, the directing means comprises a gate device, which in a first state prevents passage of an animal through said animal passage and permits passage of an animal to the milking station and which in a second state permits passage of an animal through said animal passage and prevents passage of an animal to the milking station.

According to a further embodiment of the invention, the control means is arranged to control the position of the gate device to take said second state immediately after an animal has entered the milking station. Hereby, it is possible to let an animal present in the waiting station, which is not to be milked, to enter the animal passage and pass therethrough to the receiving area while an animal is present in the milking station.

According to a further embodiment of the invention, the directing means also comprises an exit device provided at the waiting station, which exit device in an open state permits an animal to leave the waiting station and in a closed state prevents an animal from leaving the waiting station. Furthermore, the control means is arranged to close the exit gate immediately after an animal has left the waiting station. By having an exit device at the waiting station which may be closed immediately after an animal has left the waiting station, it may be guaranteed that only one animal at the time may leave the waiting station, whereby no crowding may arise at the milking station.

According to a further embodiment of the invention, the waiting station comprises an entering device, which in an open state permits an animal to enter said waiting station and in a closed state prevents an animal from entering said waiting station. Furthermore, the control means is adapted to control the position of the entering device to take the open state when the waiting station is empty and the closed state when an animal has entered the waiting station. Hereby, an animal that has entered the waiting station may not leave the same without either passing through the animal passage or the milking station. Consequently, this results in milking of an animal that has entered the waiting station and which is to be milked.

According to a further embodiment of the invention, the waiting station comprises one feed supply device for feeding an animal being present in the waiting station. The feed supply device may be arranged to entice an animal to enter the waiting station. Furthermore, by having a feed supply device in the waiting station, the waiting station may work as a feeding stall. The feed supply device in the waiting station may be the only one arranged in the receiving area. Hereby, it may be guaranteed that an animal will enter the waiting station and consequently, also be milked as often as desired. If a cow has entered the waiting station only for being fed, she may be offered an amount of feed, but only such an amount that she will return to the waiting station, at least when the value of the parameter is such that she is to be milked.

According to a further embodiment of the invention, the feed supply device is arranged to offer feed in response to the identification performed by the identification device. When an animal present in the waiting station has been identified, the identification of said specific animal is transmitted to the control means, i.e. the computer which will initiate the feeding. If the animal present in the waiting station is to be milked and an animal is already present in the milking station, the feed supply device may offer feed in the meantime. The animal may only be offered a small amount of feed at a feeding rate which makes it possible for the animal in the waiting station to consume all the feed before it is time to leave the waiting station in order to enter the milking station and be milked.

According to a further embodiment of the invention, the analysing means is arranged to compare the parameters in case that two or more animals, each of which is present in a respective of said waiting stations, are to be milked in order to determine which of these animal is in greatest need of being milked. Hereby, an animal present in a waiting station and being below the other animals, present in a respective waiting station, in rank may be milked before said other animals if so desired.

According to a further embodiment of the invention, the control means are arranged to control the directing means in response to said determination in order to direct the animal to be milked from the waiting station in question to the milking station, wherein the control means is arranged to control the position of the gate device to take said second state and to close the exit gate provided at the waiting station in question so that the waiting station in question is able to receive a new animal from the receiving area, whereby a new comparison is performed by the analysing means. By this arrangement it is guaranteed that the animal, which is in greatest need of being milked is all the time the animal that will first be milked. If the animal, last to enter a waiting station, is in greatest need of being milked, she is the one, which is first to be milked. Furthermore, it is possible during the time an animal is present in the milking station for an animal present in a waiting station, which animal is not to be milked, to be guided to pass through the animal passage and enter the receiving area.

According to a further embodiment of the invention, the milking station comprises milking means for automatic milking of an animal. When an animal has entered the milking station and is present in the milking station the automatic milking means, i.e a milking machine, is activated by the control means, i.e. the computer.

BRIEF DESCRIPTION OF THE DRAWINGS

The invention is now to be described by means of preferred embodiments and with reference to the accompanying drawings, in which.

DETAILED DESCRIPTION OF PREFERRED EMBODIMENTS OF THE INVENTION

Figure 1:
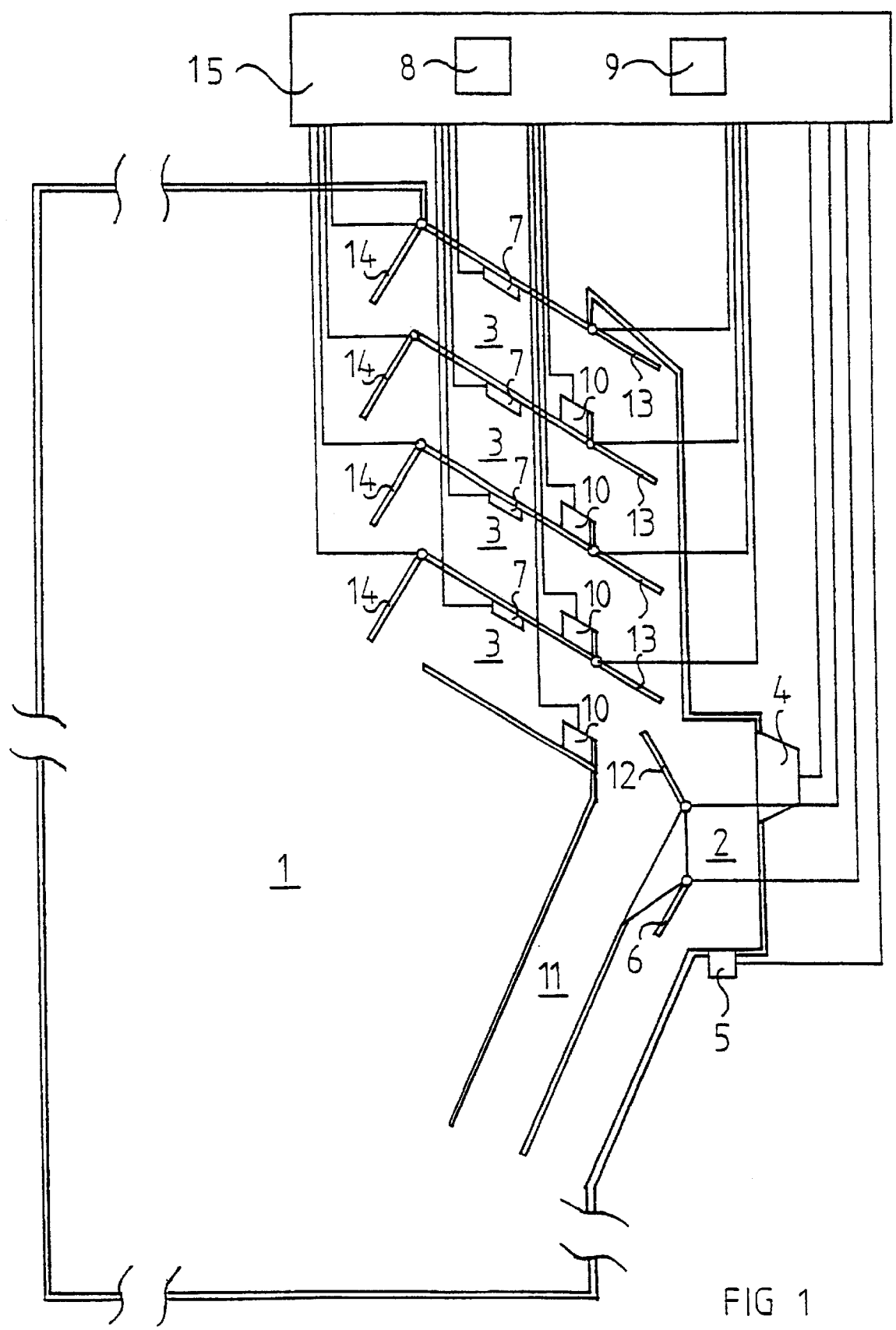
FIG. 1 shows a schematic view from above of an arrangement for managing a herd of freely walking animals according to a first embodiment of the invention.

FIG. 1 discloses an arrangement comprising a receiving area 1 for housing a herd of freely walking animals, a so-called loose house arrangement. In the following description reference will be made only to cows. The receiving area 1 may for example be a barn or an area provided outdoors, which may be enclosed by a fence. In the receiving area 1 there is provided a milking station 2 and four waiting stations 3. The milking station 2 is provided with a milking machine 4 having means for automatic attachment of the teatcups to the teats of an animal to be milked. Furthermore, the milking station 2 comprises a feed supply device 5, and an exit gate 6. Each of the four waiting stations 3 comprises an identification device 7, for identifying a specific cow, which has entered and being present in a waiting station 3. The identification device 7 is connected to memory means 8, arranged to provide a value of a parameter related to the milk production of the specific cow, and the memory means is connected to analysing means 9 arranged to analyse the value of the parameter of the specific cow. The function of the memory means 8 and the analysing means 9 will be explained further below. Furthermore, each waiting station 3 comprises a feed supply device 10.

The arrangement also comprises an animal passage 11 leading from the waiting stations 3 to the receiving area 1. A gate device 12 is provided in connection with the milking station 2 and the animal passage 11, which gate device 12 in a first state prevents passage of a cow through the animal passage 11 and permits passage of a cow to the milking station 2 and which in a second state permits passage of a cow through said animal passage 12 and prevents passage of a cow to the milking station 2.

An exit device 13 is provided at each waiting station 3, which exit device 13 in an open state permits a cow to leave the waiting station 3 and in a closed state prevents a cow from leaving the waiting station 3. In addition, each waiting station 3 comprises an entering device 14, which in an open state permits a cow to enter a waiting station 3 and in a closed state prevents a cow from entering the waiting station 3.

For controlling the arrangement, control means 15, which may include a computer, is provided. As can be seen in FIG. 1, the control means 15 is connected to the automatic milking machine 4, the feed supply device 5 and the exit gate 6 of the milking station 2, the identification devices 7 of the waiting stations 3, the feed supply devices 10 of the waiting stations 3, the gate device 12, the exit devices 13 provided at the waiting stations 3 and the entering devices 14 of the waiting stations 3. Furthermore, the memory means 8, arranged to provide a value of a parameter related to the milk production of a cow, and the analysing means 9, arranged to analyse the value of the parameter of the specific cow, are included in the control means 15.

The arrangement operates as follows. The cows are staying in the receiving are 1, a so-called loose house arrangement, where the cows may walk about freely. Sooner or later a cow will enter one of the waiting stations 3, either because she needs to be fed or because she needs to be milked. The entering device 14 of a waiting station 3 is open if the waiting station in question is empty. When a cow has entered the waiting station 3, the entering device 14 will automatically be closed. The position of the entering devices 14 is controlled by the control means 15. The cow being present in one of the waiting stations 3, is identified by the identification device 7, for example with the aid of a transponder carried by the cow. The identification of a specific cow is transmitted to the computer of the control means 15. In the computer facts about the specific cow are already stored, such as when she was last milked, the lactation status of the specific cow, milk yield of the specific cow, how much feed the specific cow has consumed since the last milking operation, etc. With regard to any one or all these facts, a value of a parameter related to the milk production is provided by the aid of the memory means 8. The value of the parameter is provided in relation to a predetermined scheme and/or rules for a specific cow, such as the interval between two milking operations, expected milk yield, etc. After the value of the parameter has been provided, the value of the parameter is transmitted to the analysing means 9, which analyse the value of the parameter and determine if the cow should be milked. If the specific cow should be milked the exit device 13 provided at the waiting station 3 in question is opened and the gate device 12 is moved to the first state, wherein the specific cow may enter the milking station 2. As can be seen in FIG. 1, the waiting stations 3 are directed towards the milking station 2 and the animal passage 11, respectively. Furthermore, the exit devices 13 provided at the waiting stations 3 are opened in a direction away from the milking station 2 and the animal passage 12, respectively. Hereby, a cow leaving any one of the waiting stations are directed towards the milking station 2 and the animal passage 11, respectively. As soon as the cow has entered the milking station 2, the gate device 12 is moved to the second state. If a cow in a waiting station 3 should be milked and the milking station is occupied, the cow may be offered feed. Facts about the specific cow, such as when she was last feed, are also stored in the computer.

The cow is offered an amount of feed at such a feeding rate that she may consume all the feed before she is leaving the waiting station for the milking station. If all the feed is not consumed, the remaining feed is gathered in a collecting chamber (not shown). Thereafter, the remaining feed may be measured and this information may later be added to the computer. If a cow in a waiting station 3 is not to be milked, maybe she has entered the waiting station 3 only for being fed, the exit device 13 provided at the waiting station 3 in question is opened an the cow may enter the animal passage 11, provided that the gate device 12 is in the second state. This may occur at the same time as another cow is present in the milking station 2. If a cow has entered a waiting station 3 only for being fed, i.e. it is not time for a milking operation, the cow in question may be offered some feed, but not as much as she will not return to the waiting station when it is time for a milking operation.

If two or more cows, each of which is present in a waiting station 3, are to be milked, the analysing means 9 is arranged to compare the values of parameters in order to determine which of these cows is in greatest need of being milked. Consequently, the analysis may be performed without reading stored information of the cows present in a respective waiting station 3, such as when each cow present in a waiting station 3 was last milked, etc., but is performed by comparing the values of the parameters, each of which is related to the milk production of a cow present in a waiting station 3. Thereafter, the computer of the control means 15, is arranged to control the position of the exit device 13 provided at the waiting station 3 in which the cow to be milked is present and the position of the gate device 12 in response to said determination in order to direct the cow to be milked from the waiting station 3 in question to the milking station 2. Thereafter, the control means 15 is arranged to control the position of the gate device 12 to take said second state and to close the exit gate 13 provided at the waiting station 3 in question so that the waiting station 3 in question is able to receive a new animal from the receiving area 1, whereby a new comparison is performed by the analysing means 9. If all the waiting stations 3 in FIG. 1 are occupied by a cow, i.e. four cows are present in a respective waiting station 3, the result of the analysis may be that none of the cows should be milked whereby the computer of the control means 15 is arranged to control the position of the exit devices 13 provided at each waiting station 3 in order to direct the cows successively to the animal passage 11.

Figure 2:
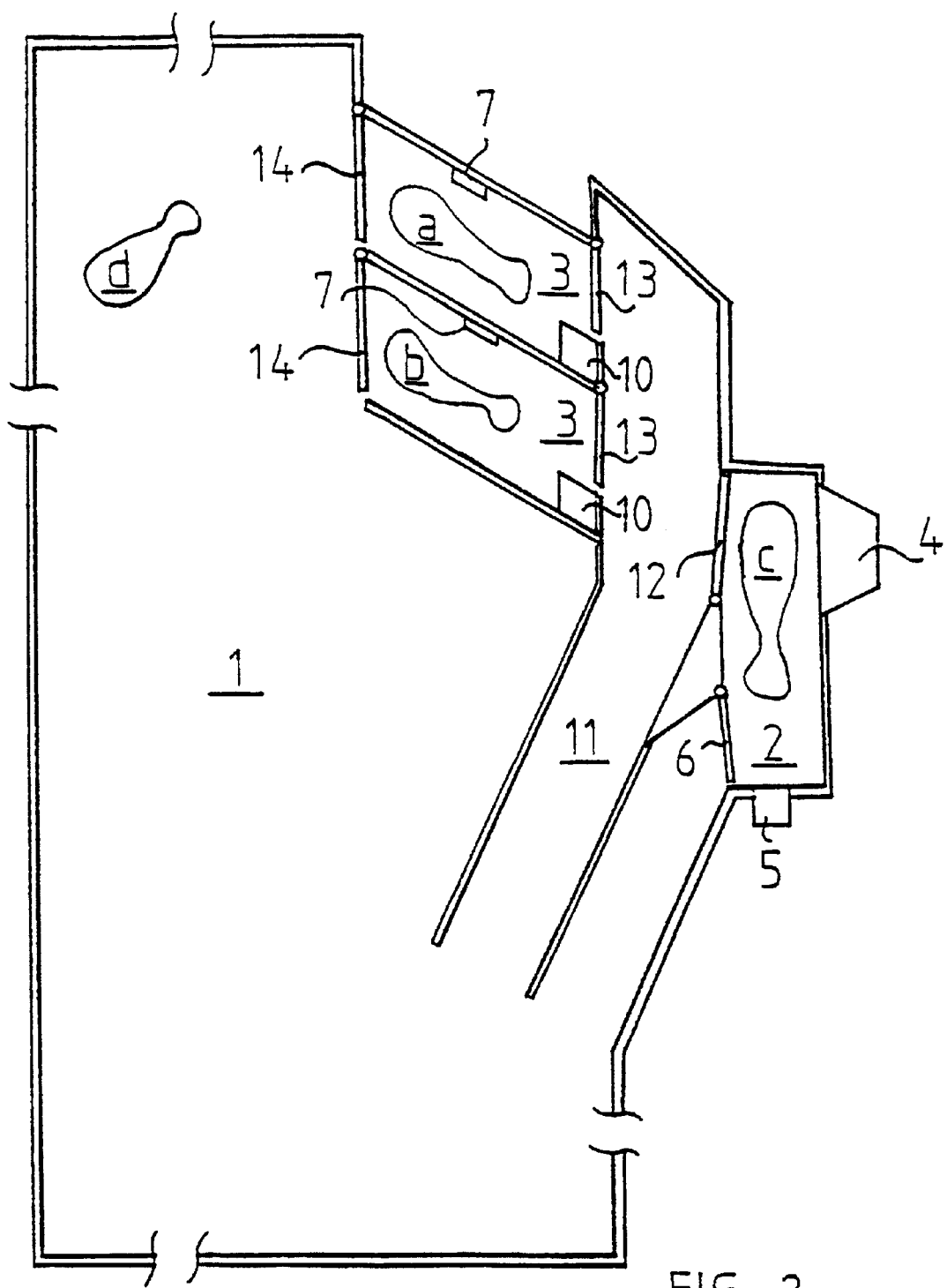
FIGS. 2–3 shows schematic views from above of some parts of an arrangement for managing a herd of freely walking animals according to a second embodiment of the invention.
Figure 3:
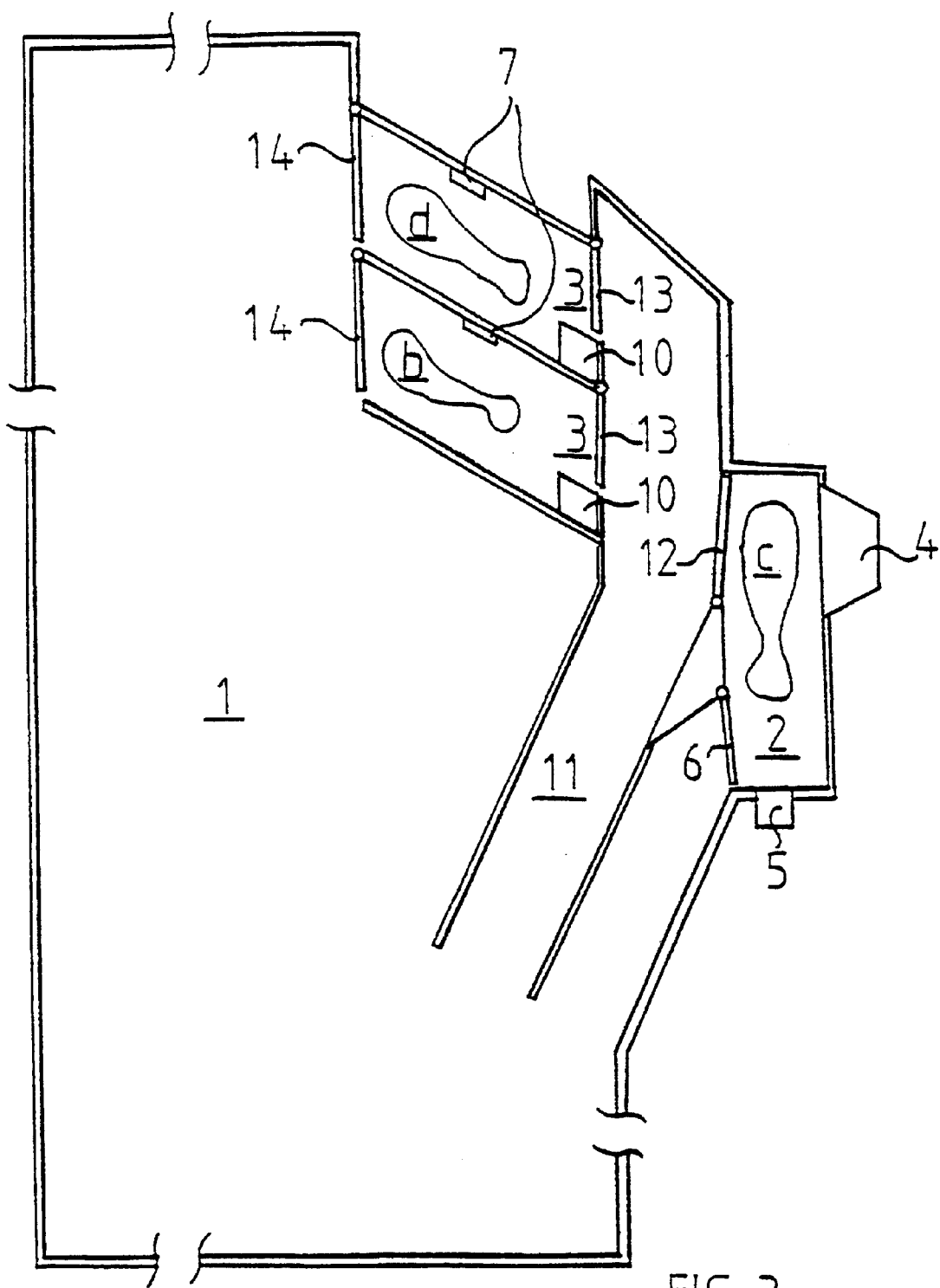

In the following a possible course of events is to be described. FIGS. 2 and 3 show a receiving area 1 in which two waiting stations 3 are located ahead of the milking station 2 and the animal passage 3. In FIG. 2 cows a, b are present in a respective waiting station 3 and a cow c is present in the milking station 2. A comparison of the values of the parameters is performed by the analysis means 9 between cow a and cow b. The result of the analysis is that cow a is not to be milked while cow b is to be milked. Since a cow c is present in the milking station 2, the computer of the control means 15 (not shown in FIG. 2) is arranged to control the position of the exit device 13 provided at the waiting station 3 in which the cow a is present, whereby this cow a may enter the animal passage 11 and consequently the receiving area 1. This is possible since the gate device 12 is positioned in its second state. After the cow a has left the waiting station 3, the computer of the control means 15 is arranged to close the exit gate 13 provided at the waiting station 3, which the cow a just has left so that another cow d from the receiving area 1 may enter said waiting station 3. In FIG. 3 the cow d is present in the waiting station 3, which the cow a just has left. A comparison of the values of the parameters is performed by the analysing means 9 between cow b and cow d. The result of this analysis is that the cow d is in greater need of being milked than the cow b, whereby, after the cow c has left the milking station 2, the computer of the control means 15, is arranged to control the position of the exit device 13 provided at the waiting station 3 in which the cow d is present and the position of the gate device 12 to take the first state so that the cow d may enter the milking station 2.

The milking machine 4, having means for automatic attachment of the teatcups to the teats of an animal to be milked, is activated by the computer of the control means 15. During the milking operation the cow may be offered feed. After the milking operation the cow should leave the milking station 2 as soon as possible, wherein a new cow may enter the milking station 2 so that a high utilisation of the milking machine 4 is achieved. To this end, the control means 15 sends out signals to stop the feeding by the feeding device 5 and to open the exit device 6.

The present invention is not limited to the embodiment disclosed herein but may be varied and modified within the scope of the following claims. It is to be noted that the number of waiting stations 3 located ahead of a milking station 2 is preferably between two and four.

What is claimed is:

1. An arrangement for managing a herd of freely walking animals, comprising:
    an area for receiving the animals;
    a milking station;
    a plurality of waiting stations leading from the receiving area to at least the milking station, wherein each waiting station is arranged to receive one animal and comprises an identification device for identifying said animal entering said waiting station;
    memory means arranged for providing a value of a parameter related to the milk production of an animal identified by the identification device, and present in one of said waiting stations; and
    means for analyzing the value of the parameter and determining if an animal present in one of said waiting stations is to be milked in response to said value and with regard to said value for an animal present in another one of said waiting stations.

2. An arrangement according to claim 1, wherein the parameter involves at least one of the lactation status of an animal, a desired interval between two milking operations of an animal and the expected milk yield of an animal.

3. An arrangement according to claim 1, including an animal passage which leads from the waiting station past the milking station to the receiving area.

4. An arrangement according to claim 3, including directing means arranged to direct the animal from the waiting station either to the animal passage or the milking station.

5. An arrangement according to claim 4, including control means adapted to control the directing means in response to said determination in order to direct said animal either to the milking station in the case of a milking operation of the animal or to the animal passage leading the animal through the animal passage into the receiving area.

6. An arrangement according to claim 5, wherein the directing means comprises a gate device which in a first state prevents passage of an animal through said animal passage and permits passage of an animal to the milking station and which in a second state permits passage of an animal through said animal passage and prevents passage of an animal to the milking station.

7. An arrangement according to claim 6, wherein the control means is arranged to control the position of the gate device to take said second state immediately after an animal has entered the milking station.

8. An arrangement according to claim 6, wherein the directing means also comprises an exit gate provided at the waiting station, which exit gate in an open state permits an animal to leave the waiting station and in a closed state prevents an animal from leaving the waiting station.

9. An arrangement according to claim 8, wherein the control means is arranged to close the exit gate immediately after an animal has left the waiting station.

10. An arrangement according to claim 1, wherein the waiting station comprises an entering device which in an open state permits an animal to enter said waiting station and in a closed state prevents an animal from entering said waiting station.

11. An arrangement according to claim 10, including control means adapted to control the directing means in response to said determination in order to direct said animal either to the milking station in the case of a milking operation of the animal or to the animal passage leading the animal through the animal passage into the receiving area and wherein the control means is adapted to control the position of the entering device to take the open state when the waiting station is empty and the closed state when an animal has entered the waiting station.

12. An arrangement according to claim 1, wherein the waiting station comprises one feed supply device for feeding an animal being present in the waiting station.

13. An arrangement according to claim 12, wherein the feed supply device is arranged to offer feed in response to the identification performed by the identification device.

14. An arrangement according to claim 1, wherein the analysing means is arranged to compare the parameters in case that two or more animals, each of which is present in a respective one of said waiting stations, are to be milked in order to determine which of these animals is in greatest need of being milked.

15. An arrangement according to claim 8, wherein the analysing means is arranged to compare the parameters in case that two or more animals, each of which is present in a respective one of said waiting stations, are to be milked in order to determine which of these animals is in greatest need of being milked and wherein the control means are arranged to control the directing means in response to said determination in order to direct the animal to be milked from the waiting station in question to the milking station, wherein the control means is arranged to control the position of the gate device to take said second state and to close the exit gate provided at the waiting station in question so that the waiting station in question is able to receive a new animal from the receiving area, whereby a new comparison is performed by the analyzing means.

16. An arrangement according to claim 1, wherein the milking station comprises milking means for automatic milking of an animal.

17. In combination, an arrangement for managing a herd of freely walking animals and an automatic milking machine for dairy animals, said arrangement comprising:
    an area for receiving the animals;
    a milking station;
    a plurality of waiting stations leading from the receiving area to at least the milking station, wherein each walking station is arranged to receive one animal and comprises an identification device for identifying an animal having entered and present in one of said waiting stations;

memory means arranged for providing a value of a parameter related to the milk production of an animal identified by the identification device and present in one of the said waiting stations; and means for analyzing the value of the parameter and determining if an animal present in one of said waiting stations is to be milked in response to said value and with regard to said value for an animal present in another one of said waiting stations; said combination further including controls means for activating the automatic milking machine, and wherein said automatic milking machine is positioned for milking an animal present in said milking station.

* * * * *